US012361903B2

(12) United States Patent
Sasanuma et al.

(10) Patent No.: US 12,361,903 B2
(45) Date of Patent: Jul. 15, 2025

(54) ELECTROCHROMIC DEVICE

(71) Applicant: Japan Display Inc., Tokyo (JP)

(72) Inventors: Keita Sasanuma, Tokyo (JP); Yoshikazu Hashiba, Tokyo (JP)

(73) Assignee: Japan Display Inc., Tokyo (JP)

( * ) Notice: Subject to any disclaimer, the term of this patent is extended or adjusted under 35 U.S.C. 154(b) by 0 days.

(21) Appl. No.: 18/646,363

(22) Filed: Apr. 25, 2024

(65) Prior Publication Data

US 2024/0371334 A1 Nov. 7, 2024

(30) Foreign Application Priority Data

May 1, 2023 (JP) ................................. 2023-075696

(51) Int. Cl.
*G09G 3/34* (2006.01)

(52) U.S. Cl.
CPC ......... *G09G 3/344* (2013.01); *G09G 2310/08* (2013.01)

(58) Field of Classification Search
None
See application file for complete search history.

(56) References Cited

U.S. PATENT DOCUMENTS

2006/0077190 A1* 4/2006 Zhou ...................... G09G 3/344 345/204
2010/0164914 A1 7/2010 Cassidy
2014/0267213 A1* 9/2014 Wakabayashi ....... G09G 3/3648 345/212
2015/0070248 A1* 3/2015 Tsai ........................ G06F 3/044 345/1.2
2018/0090046 A1* 3/2018 Hong ................... G09G 3/3614
2018/0261180 A1* 9/2018 Zhou ................... G02F 1/13306
2020/0160768 A1* 5/2020 Wang ....................... G09G 3/20

FOREIGN PATENT DOCUMENTS

JP 2010-518456 A 5/2010

* cited by examiner

*Primary Examiner* — Matthew Yeung
(74) *Attorney, Agent, or Firm* — K&L Gates LLP

(57) ABSTRACT

An electrochromic device includes: two electrodes with an electrochromic material therebetween; switching elements, a source or a drain of each of which is coupled to one of the two electrodes; scanning lines coupled to gates of the switching elements; transmission lines coupled to the other one of the source and the drain of each switching element; and first switches capable of individually switching coupling between a first wiring and each transmission line. A first period and a second period are alternately provided. In the first period, reset potentials of the transmission lines are given at either a first timing before a signal to be transmitted to the gates is given to the scanning lines or a second timing after the signal is given to the scanning lines. In the second period, the signal potential is given to the transmission lines at the other timing of the first and second timings.

4 Claims, 10 Drawing Sheets

ELECTROCHROMIC DEVICE

CROSS-REFERENCE TO RELATED APPLICATION

This application claims the benefit of priority from Japanese Patent Application No. 2023-075696 filed on May 1, 2023, the entire contents of which are incorporated herein by reference.

BACKGROUND

1. Technical Field

What is disclosed herein relates to an electrochromic device.

2. Description of the Related Art

As described in Japanese Patent Publication No. 2010-518456, there has been known an electrochromic device capable of forming an area in which the degree of light transmission and the degree of coloration can be controlled in accordance with an applied voltage.

In an active matrix system that utilizes a plurality of switching elements to control the voltage that is applied to an electrochromic material, it is important to individually control potentials given to the switching elements for the purpose of achieving more appropriate device control. Specifically, the occurrence of an event should be substantially prevented in which a potential to be given to the source or drain of a switching element is also given to the source or drain of another switching element. However, Japanese Patent Publication No. 2010-518456 does not specifically describe such control and accordingly lacks feasibility.

For the foregoing reasons, there is a need for an electrochromic device capable of achieving more appropriate device control.

SUMMARY

According to an aspect, an electrochromic device includes: two electrodes facing each other with an electrochromic material interposed therebetween; a plurality of switching elements, one of a source and a drain of each of the switching elements being coupled to one of the two electrodes; a plurality of scanning lines coupled to gates of the switching elements; a plurality of transmission lines coupled to the other one of the source and the drain of each of the switching elements; and a plurality of first switches capable of individually switching coupling between a first wiring and each of the transmission lines, the first wiring being configured to be supplied with a signal potential corresponding to an application potential given to the one of the two electrodes. A first period and a second period are alternately provided. The first period is a period in which reset potentials of the transmission lines are given at either a timing before a signal to be transmitted to the gates is given to the scanning lines or a timing after the signal to be transmitted to the gates is given to the scanning lines. The second period is a period in which the signal potential is given to the transmission lines at the other timing of the timing before the signal to be transmitted to the gates is given to the scanning lines and the timing after the signal to be transmitted to the gates is given to the scanning lines.

DETAILED DESCRIPTION

Figure 1:
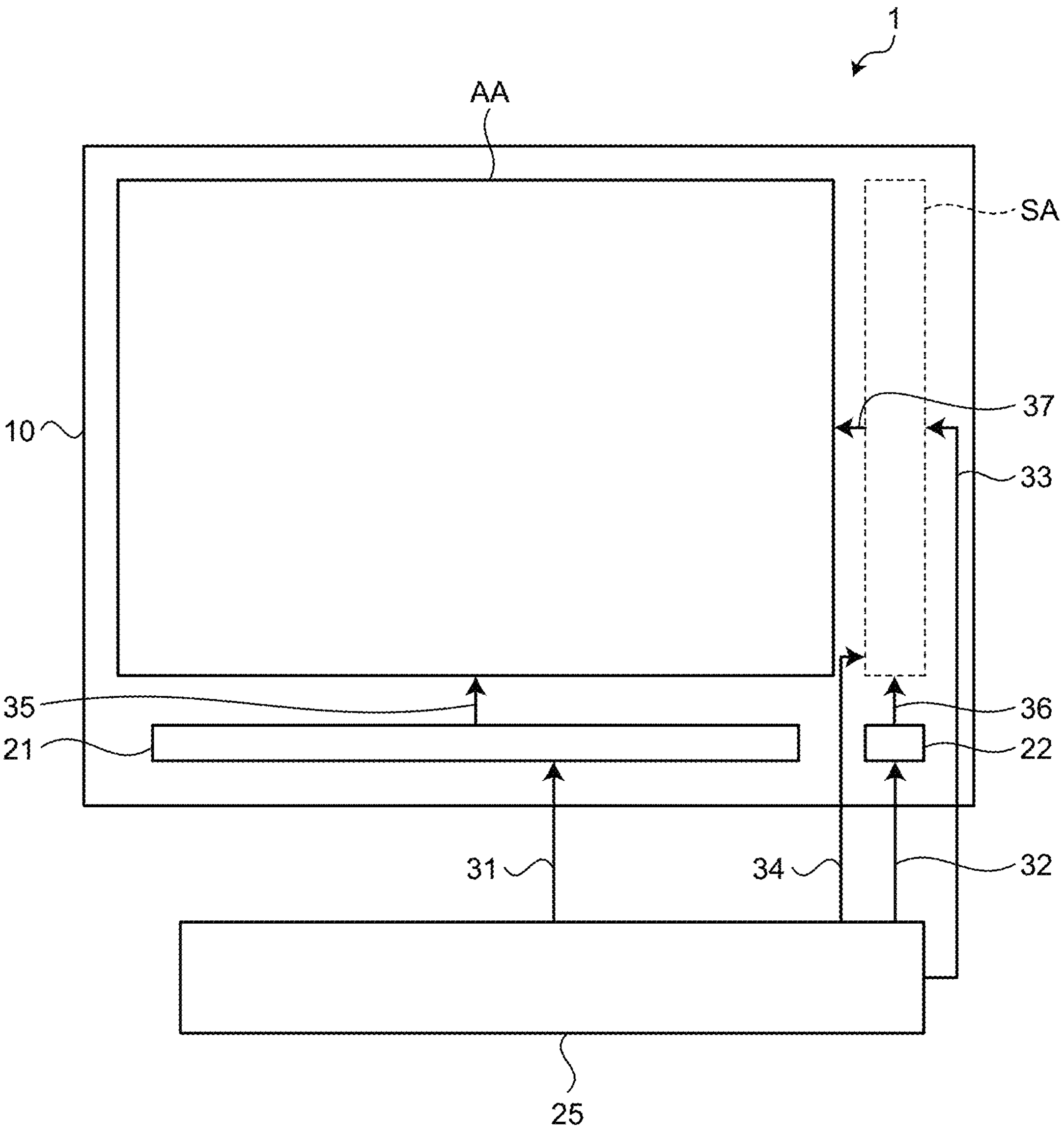
FIG. 1 is a schematic diagram illustrating a main configuration of a device.

Hereinafter, embodiments according to the present disclosure will be described with reference to the drawings. What is disclosed herein is merely an example, and the present disclosure naturally encompasses appropriate modifications that are easily conceivable by those skilled in the art while maintaining the gist of the invention. For the purpose of further clarifying the description, the drawings sometimes schematically illustrate, the widths, thicknesses, shapes, and the likes of constituents as compared with actual aspects, but they are merely examples, and interpretation of the present disclosure is not limited thereto. In the present specification and the drawings, the same constituents as those illustrated in a drawing having already been discussed are given the same reference numerals and detailed description thereof will be sometimes appropriately omitted.

First Embodiment

FIG. 1 is a schematic diagram illustrating a main configuration of a device 1. The device 1 is an electrochromic device. Hereinafter, unless otherwise noted, the term EC denotes ElectroChromic. The EC device is a device that utilizes an EC material 15 (see FIG. 3) capable of reversibly controlling the degree of light transmission and the degree of coloration by the control of a voltage that is applied thereto. Examples of the EC material 15 include ion-implanted metal oxides such as tungsten oxide ($WO_3$), but the EC material 15 is not limited to them, and other materials that cause the same phenomenon as the above-described materials may be employed as the EC material 15.

As illustrated in FIG. 1, the device 1 includes an EC panel 10 in which an active area AA is formed. The EC material 15 described above is sealed in the active area AA. Therefore, the degree of light transmission and the degree of coloration in the active area AA can be controlled by the control of the voltage that is applied to the EC material 15.

Various signals related to the control of the voltage that is applied to the EC material 15 are given to the EC panel 10 from a host 25. The signals are given through different paths in accordance with roles of the signals. In an example illustrated in FIG. 1, wirings 31, 32, 33, 34 extend from the host 25.

A signal outputted via the wiring 31 is given as a drive signal to the active area AA via a gate driver 21 and a wiring 35. A signal outputted via the wiring 32 is given to a switching circuit area SA via a decoder 22 and a wiring 36. The potential of a signal outputted via the wiring 33 is given as an application potential to the active area AA via the switching circuit area SA and a wiring 37. The potential of a signal outputted via the wiring 34 is given as a reset potential to the active area AA via the switching circuit area SA and the wiring 37.

Figure 2:
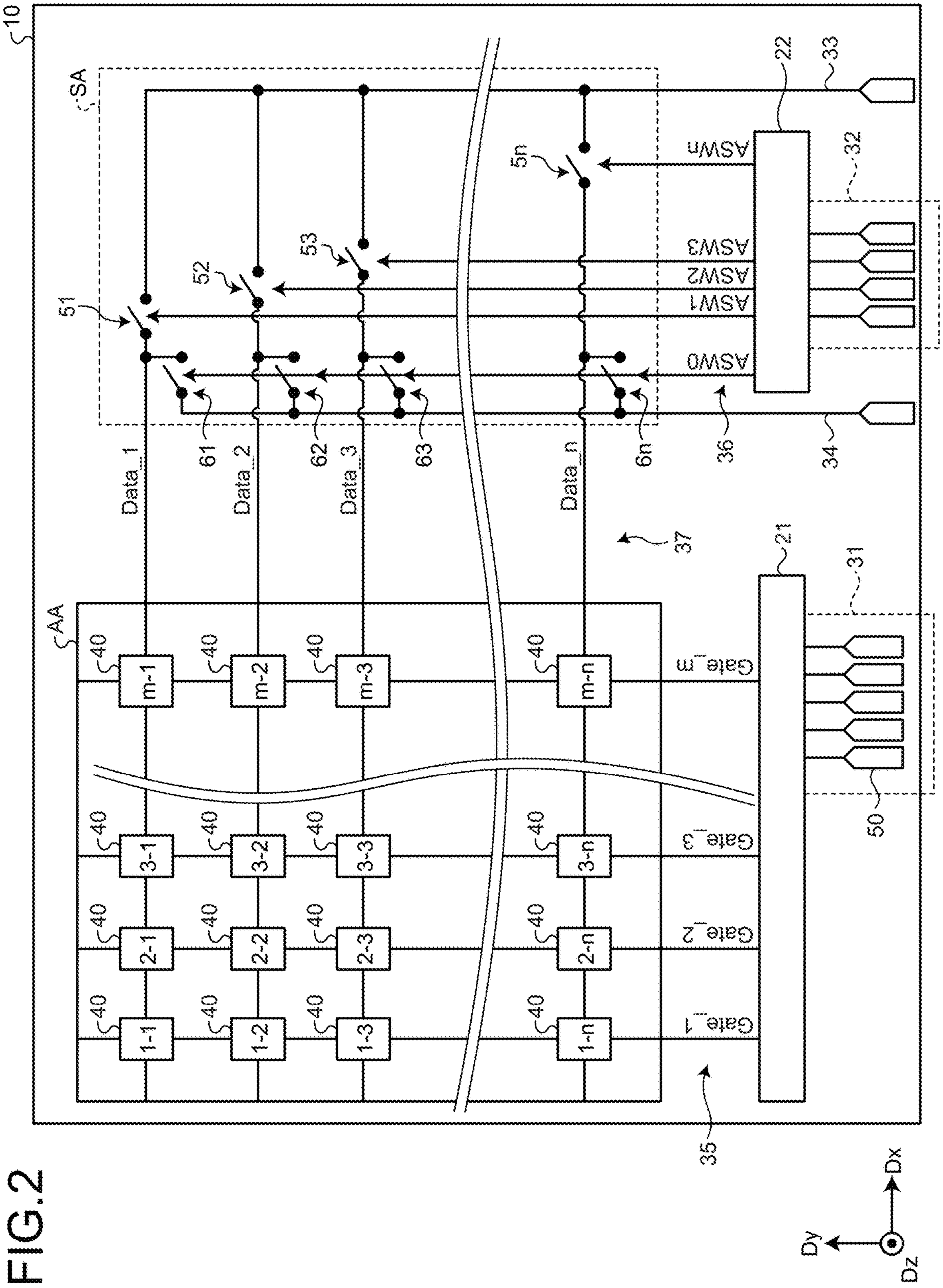
FIG. 2 is a schematic diagram illustrating a configuration example of an EC panel.

FIG. 2 is a schematic diagram illustrating a configuration example of the EC panel 10. As illustrated in FIG. 2, a plurality of switching elements 40 is arranged in a matrix of a row-column configuration in the active area AA. Hereinafter, a first direction Dx denotes one of the alignment directions of the switching elements 40 arranged in the matrix of a row-column configuration. A second direction Dy is the other of the alignment directions of the switching elements 40 arranged in the matrix of a row-column configuration. The first direction Dx and the second direction Dy are orthogonal to each other. A third direction Dz denotes a direction orthogonal to the first direction Dx and the second direction Dy.

Figure 3:
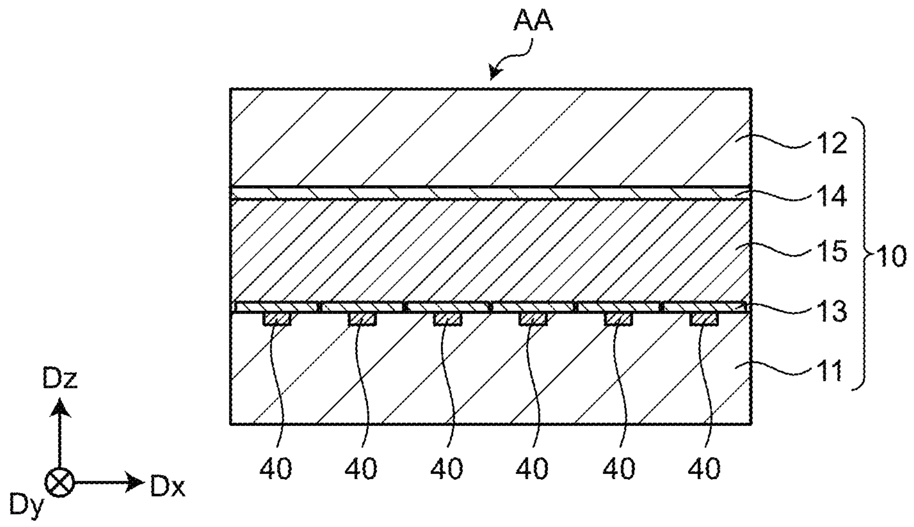
FIG. 3 is a schematic diagram illustrating a main configuration included in a multilayered structure of an active area.

FIG. 3 is a schematic diagram illustrating a main configuration included in a multilayered structure of the active area AA. As illustrated in FIG. 3, the EC panel 10 is configured such that a first substrate 11 and a second substrate 12 face each other in the third direction Dz with the EC material 15 interposed therebetween, thereby sealing the EC material 15. The first substrate 11 and the second substrate 12 are each a substrate having light transmission properties such as a glass substrate. Although not illustrated, a sealing material is provided so as to rim the active area AA in plan view as viewing the Dx-Dy plane from its front. The EC material 15 is sealed in the active area AA by the first substrate 11, the second substrate 12, and the sealing material.

A first electrode 13 is formed on a surface of the first substrate 11 facing the EC material 15. A second electrode 14 is formed on a surface of the second substrate 12 facing the EC material 15. The voltage that is applied to the EC material 15 is determined by a potential difference between the first electrode 13 and the second electrode 14. In the present embodiment, a constant potential is given to the second electrode 14. However, "a constant potential is given to the second electrode 14" does not strictly mean that the entire second electrode 14 is caused to assume a completely constant potential, but merely indicates that the constant potential is externally given to the second electrode 14 through terminal coupling or the like. In the first embodiment, on the precondition that the potential of the second electrode 14 is static, the voltage that is applied to the EC material 15 is controlled by controlling the potential of each first electrode 13. The switching elements 40 are coupled to the first electrodes 13. Although not illustrated in FIG. 3, various configurations necessary for causing the switching elements 40 to function, such as wiring lines including scanning lines 350 and transmission lines 370 to be described later, are provided in the multilayered structure between the first substrate 11 and the first electrode 13.

Figure 4:
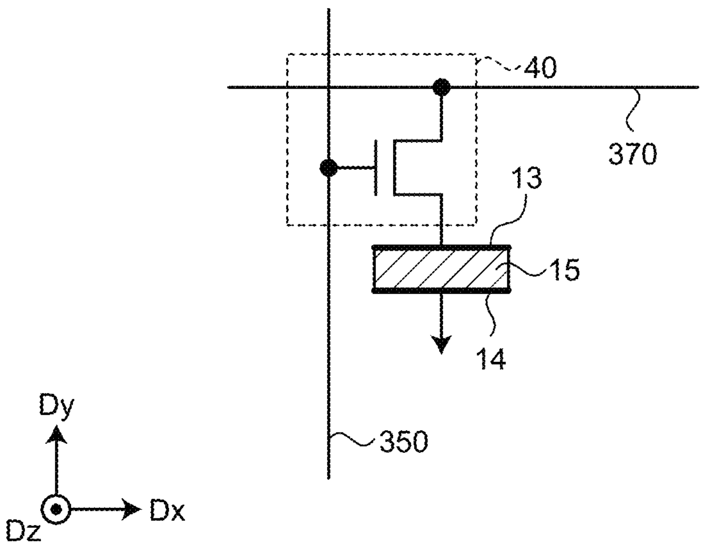
FIG. 4 is a schematic circuit diagram illustrating a configuration of a switching element.

FIG. 4 is a schematic circuit diagram illustrating a configuration of the switching element 40. The switching element 40 is a field effect transistor (FET). The gate of the switching element 40 is coupled to the scanning line 350. One of the source and the drain of the switching element 40 is coupled to the transmission line 370. The other one of the source and the drain of the switching element 40 is coupled to the first electrode 13. In other words, the switching element 40 functions as a switching element that, at the timing when a signal (drive signal) is given to the gate via the scanning line 350, gives the first electrode 13 a potential corresponding to a potential (for example, an application potential or a reset potential) caused by a signal transmitted via the transmission line 370.

The transmission line 370 illustrated in FIG. 4 is any of transmission lines Data_1, Data_2, Data_3, . . . , Data_n illustrated in FIG. 2. The wiring 37 includes a plurality of transmission lines, such as the transmission lines Data_1, Data_2, Data_3, . . . . Data_n illustrated in FIG. 2. The transmission lines are coupled to the wiring 33 via the switching circuit area SA. n is a natural number equal to or greater than 2 and indicates the number of the switching elements 40 aligned in the second direction Dy and the number of the transmission lines. The switching elements 40 aligned in the first direction Dx share the same transmission line.

The transmission lines such as the transmission lines Data_1, Data_2, Data_3, Data_n are coupled to the wiring 33 via first switches 51, 52, 53, . . . , 5*n*, respectively. As illustrated in FIG. 2, the transmission line Data_1 is coupled to the wiring 33 via the first switch 51. The transmission line Data 2 is coupled to the wiring 33 via the first switch 52. The transmission line Data 3 is coupled to the wiring 33 via the first switch 53. Likewise, the transmission line Data_n is coupled to the wiring 33 via the first switch 5*n*.

Furthermore, in the first embodiment, the transmission lines such as the transmission lines Data_1, Data_2, Data_3, . . . , Data_n are coupled to the wiring 34 via second switches 61, 62, 63, . . . , 6*n*, respectively. As illustrated in FIG. 2, the transmission line Data_1 is coupled to the wiring 34 via the second switch 61. The transmission line Data_2 is coupled to the wiring 34 via the second switch 62. The transmission line Data 3 is coupled to the wiring 34 via the second switch 63. Likewise, the transmission line Data_n is coupled to the wiring 34 via the second switch 6*n*. Positions at which the transmission lines are coupled to the second switches 61, 62, 63, . . . , 6*n*, respectively, are closer to the active area AA than positions at which the transmission lines are coupled to the first switches 51, 52, 53, . . . , 5*n*, respectively.

The first switches 51, 52, 53, . . . , 5*n* and the second switches 61, 62, 63, . . . , 6*n* operate under the control of the decoder 22.

The decoder 22 is coupled to wiring lines ASW1, ASW2, ASW3, ASWn that transmit signals for individually controlling the first switches 51, 52, 53, . . . , 5*n*. As illustrated in FIG. 2, the wiring line ASW1 couples the decoder 22 to the first switch 51. The wiring line ASW2 couples the decoder 22 to the first switch 52. The wiring line ASW3 couples the decoder 22 to the first switch 53. Likewise, the wiring line ASWn couples the decoder 22 to the first switch 5*n*. The wiring 36 includes the wiring lines ASW1, ASW2, ASW3, . . . , ASWn.

In the first embodiment, the decoder 22 is coupled to a wiring line ASW0 that transmits a signal for collectively controlling the second switches 61, 62, 63, . . . , 6*n*. The wiring line ASW0 couples the decoder 22 to the second switches 61, 62, 63, . . . , 6*n*. The wiring 36 in the first embodiment further includes the wiring line ASW0, in addition to the wiring lines ASW1, ASW2, ASW3, . . . , ASWn.

The decoder 22 operates in accordance with a signal given from the host 25 via the wiring 32 to control the operation of the first switches 51, 52, 53, . . . , 5*n* and the second switches 61, 62, 63, . . . , 6*n*. More specifically, the decoder 22 functions as a so-called combinational logic circuit and is capable of controlling the operation of the first switches 51, 52, 53, . . . , 5*n* and the second switches 61, 62, 63, . . . , 6*n* in accordance with the signal given via the wiring 32 including a smaller number of wiring lines than the number of the wiring lines included in the wiring 36.

The scanning line 350 illustrated in FIG. 4 is any of scanning lines Gate_1, Gate_2, Gate_3, . . . , Gate_m illustrated in FIG. 2. The wiring 35 includes a plurality of scanning lines such as the scanning lines Gate_1, Gate_2, Gate_3, . . . , Gate_m illustrated in FIG. 2. The gate driver 21 operates in accordance with a signal given from the host 25 via the wiring 31 and sequentially gives the drive signal to the scanning lines Gate_1, Gate_2, Gate_3, . . . . Gate_m. m is a natural number equal to or greater than 2 and indicates the number of the switching elements 40 aligned in the first direction Dx and the number of the scanning lines. The switching elements 40 aligned in the second direction Dy share the same scanning line.

Figure 5:
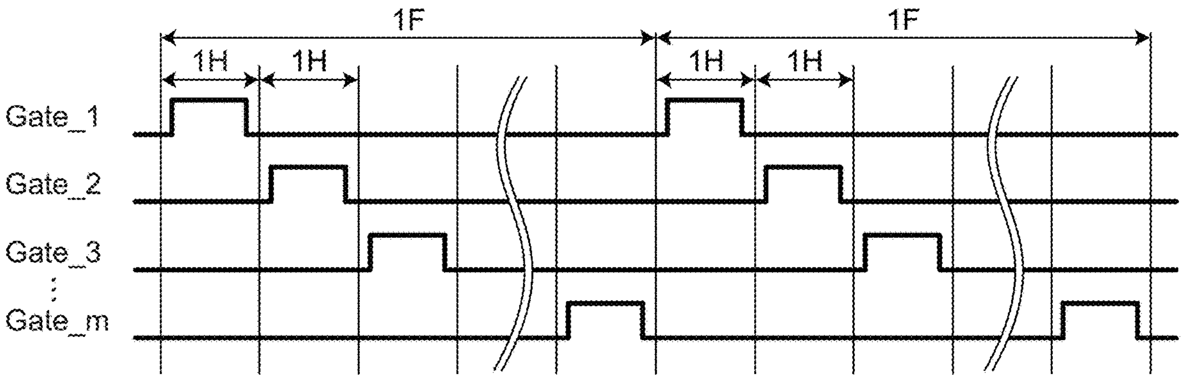
FIG. 5 is a time chart illustrating timing control of a drive signal.

FIG. 5 is a time chart illustrating the timing control of the drive signal. In FIG. 5 and other figures, the potential of each of the scanning lines Gate_1, Gate_2, Gate_3, Gate_m in the time chart becomes high (High) in a period when the drive signal is given and becomes low (Low) in a period when no drive signal is given.

As illustrated in FIG. 5, the drive signal is sequentially given to the scanning lines Gate_1, Gate_2, Gate_3, . . . , Gate_m. A period serving as a unit of changing the scanning line to which the drive signal is given from one to another is referred to as a unit period 1H. In FIG. 5, a period in which all the scanning lines Gate_1, Gate_2, Gate_3, . . . , Gate_m aligned in the first direction Dx are given the drive signal once is referred to as a frame period 1F. In the device 1, a state of the active area AA is periodically controlled by periodically repeating the frame period 1F.

The following describes the signal control in the unit period 1H described with reference to FIG. 5 in more detail.

Figure 6:
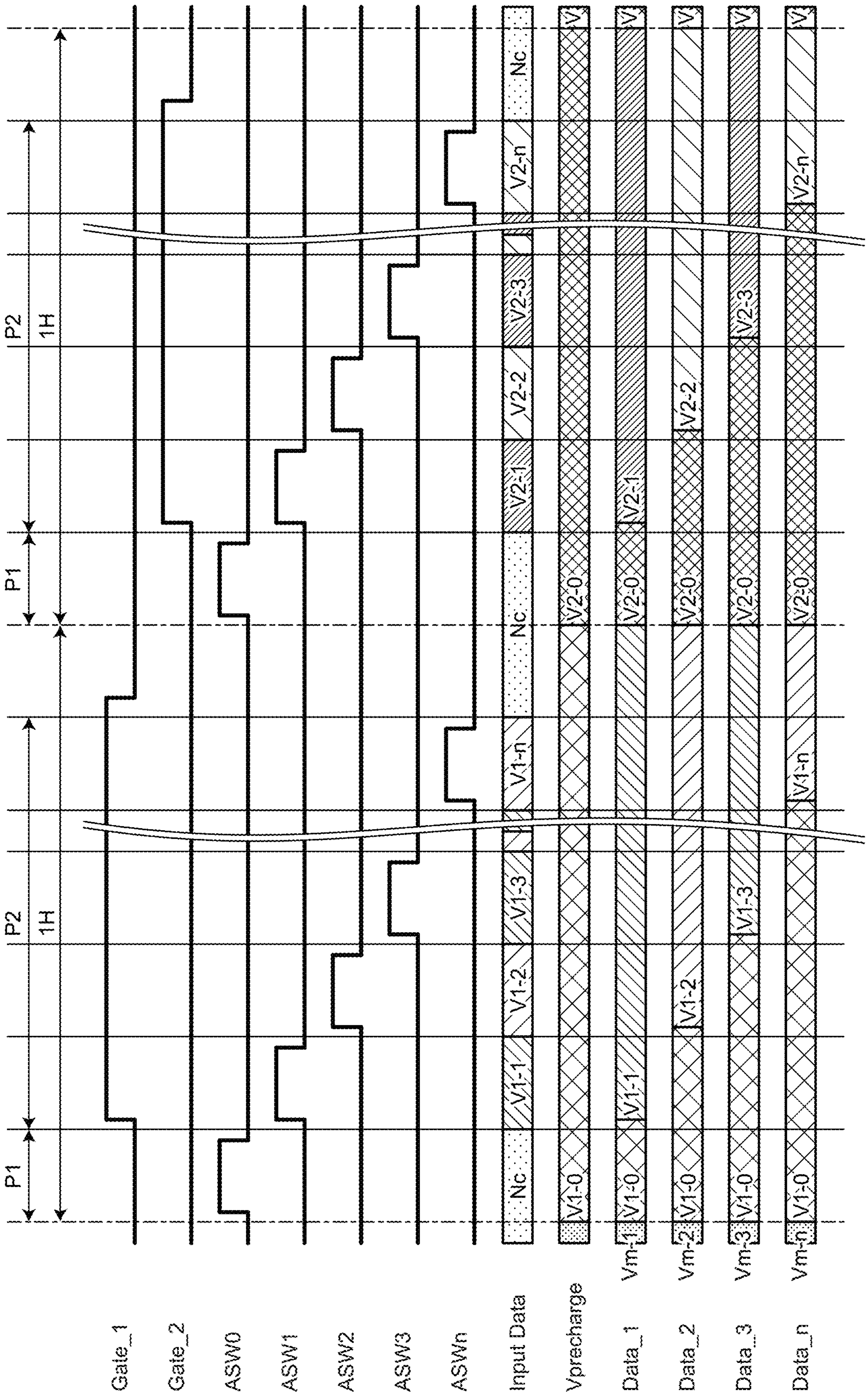
FIG. 6 is a time chart illustrating signal control in a first embodiment.

FIG. 6 is a time chart illustrating signal control in the first embodiment. FIG. 6 and later-mentioned FIGS. 8, 10, and 11 each illustrate only periods in which the drive signals are given to the scanning line Gate_1 and the scanning line Gate_2, but the signal control based on the same concept as above is also applied to periods in which the drive signals are given to the other scanning lines. The term Input Data in these figures denotes a potential caused by a signal given via the wiring 33. The term Vprecharge denotes a potential caused by a signal given via the wiring 34.

First, a unit period 1H in which the drive signal is given to the scanning line Gate_1 will be described. Before the start of the period in which the drive signal is given, a first period P1 in which the potential of the wiring line ASW0 becomes high is provided. When the potential of the wiring line ASW0 becomes high, the second switches 61, 62, 63, . . . , 6*n* become in a coupling state (ON). Thus, the wiring 34 is coupled to the transmission lines Data_1, Data_2, Data_3, . . . , Data_n. In other words, Vprecharge at a reset potential V1-0 is given to the transmission lines Data_1, Data_2, Data_3, . . . , Data_n. Hence, in the first period P1, the potentials of the transmission lines Data_1, Data_2, Data_3, . . . , Data_n become a potential corresponding to the reset potential V1-0. By the end of the first period P1, the potential of the wiring line ASW0 returns to a low state. In other words, by the end of the first period P1, the second switches 61, 62, 63, . . . , 6*n* return to an uncoupling state (OFF).

After the end of the first period P1, a second period P2 in which the drive signal is given to the scanning line Gate_1 starts. When the drive signal is given to the scanning line Gate_1, a voltage is applied to the gates of the switching elements 40 named "1-1", "1-2", "1-3", . . . , "1-n" out of the switching elements 40 illustrated in FIG. 2, which causes the continuity between the source and the drain of each of the switching elements 40. In the second period P2, the potentials of the wiring lines ASW1, ASW2, ASW3, . . . , ASWn become high at different timings, and a signal corresponding to the wiring line whose potential has become high is supplied to the wiring 33 as Input Data.

In the example illustrated in FIG. 6, when the potential of the wiring line ASW1 becomes high, the potential of Input Data becomes an application potential V1-1. Thus, the first switch 51 becomes in the coupling state (ON), so that the wiring 33 is coupled to the transmission line Data_1. In other words, at this timing, a potential corresponding to the application potential V1-1 given to the transmission line Data_1 passes between the source and the drain of the switching element 40 named "1-1" and is given to the first electrode 13 coupled to the switching element 40. When the potential of the wiring line ASW2 becomes high, the potential of Input Data becomes an application potential V1-2. Thus, a potential corresponding to the application potential V1-2 is given to the first electrode 13 coupled to the switching element 40 named "1-2". When the potential of the wiring line ASW3 becomes high, the potential of Input Data becomes an application potential V1-3. Thus, a potential corresponding to the application potential V1-3 is given to the first electrode 13 coupled to the switching element 40 named "1-3". Likewise, when the potential of the wiring line ASWn becomes high, the potential of Input Data becomes an application potential V1-n. Thus, a potential corresponding to the application potential V1-n is given to the first electrode 13 coupled to the switching element 40 named "1-n".

After the end of a unit period 1H (an earlier unit period 1H) in which the drive signal is given to the scanning line Gate_1, another unit period 1H (a later unit period 1H) in which the drive signal is given to the scanning line Gate_2 starts. The same process as in the earlier unit period 1H is performed also in the later unit period 1H. That is, before the start of the period in which the drive signal is given, the first period P1 in which the potential of the wiring line ASW0 becomes high is provided, and then the second period P2 in which the drive signal is given to the scanning line Gate_2 starts. Therefore, in the later unit period 1H, the potentials of transmission lines Data_1, Data_2, Data_3, . . . , Data_n become a potential corresponding to a reset potential V2-0 in the first period P1.

The later unit period 1H is the same as the earlier unit period 1H in that, in the second period P2, the potentials of the wiring lines ASW1, ASW2, ASW3, . . . , ASWn become high at different timings and a signal corresponding to the wiring line whose potential becomes high is supplied as Input Data to the wiring 33. However, the switching elements 40 and the first electrodes 13 to each of which a potential corresponding to Input Data is given correspond to the transmission lines 370 to which the drive signal is given. Hence, the switching elements 40 to each of which the potential corresponding to Input Data is given in the later unit period 1H are the switching elements 40 coupled to the scanning line Gate_2 in FIG. 2 (the switching elements 40 named "2-1", "2-2", "2-3" "2-n"). At the later unit period 1H, a potential corresponding to an application potential V2-r passes between the source and the drain of the switching element 40 named "2-r" and is given to the first electrode 13 coupled to the switching element 40. r is a natural number within a range from 1 to n.

Unit periods 1H in which the drive signal is given to the scanning line Gate_3 and subsequent scanning lines 350 are not illustrated, but are the same as the unit period 1H in which the drive signal is given to the scanning line Gate_1 or the scanning line Gate_2.

Nc (No care) in Input Data denotes no signal output from the host 25 to the wiring 33.

The host 25 illustrated in FIG. 1 is a circuit or an information processing device that outputs various signals for establishing signal control as illustrated in FIG. 6. Specifically, the host 25 outputs a signal that is transmitted via the wiring 31 to periodically operate the gate driver 21. The host 25 also outputs a signal that is transmitted via the wiring 32 to periodically operate the decoder 22. The host 25 also outputs a signal corresponding to contents indicated as Input Data to the wiring 33. The host 25 also outputs a signal functioning as Vprecharge to the wiring 34.

The host 25 may be mounted on the first substrate 11 or coupled to the EC panel 10 via a member such as a flexible printed circuit (FPC). A pentagonal terminal 50 illustrated in FIG. 2 is a schematic example of a terminal that connects an FPC to which the host 25 is mounted. In the case where the host 25 is mounted on the first substrate 11, the switching elements 40 may be omitted. In this case, the wirings 31, 32, 33, 34, 35, 36, 37 are provided as wiring patterns to be mounted on the first substrate 11. In contrast, in the case where the host 25 is coupled to the EC panel 10 via an FPC, the wirings 31, 32, 33, 34 are partially included in the FPC.

Hereinbefore, the first embodiment has been described. Next, another EC panel 10A, which is different from that in the first embodiment, will be described with reference to FIG. 7.

Figure 7:
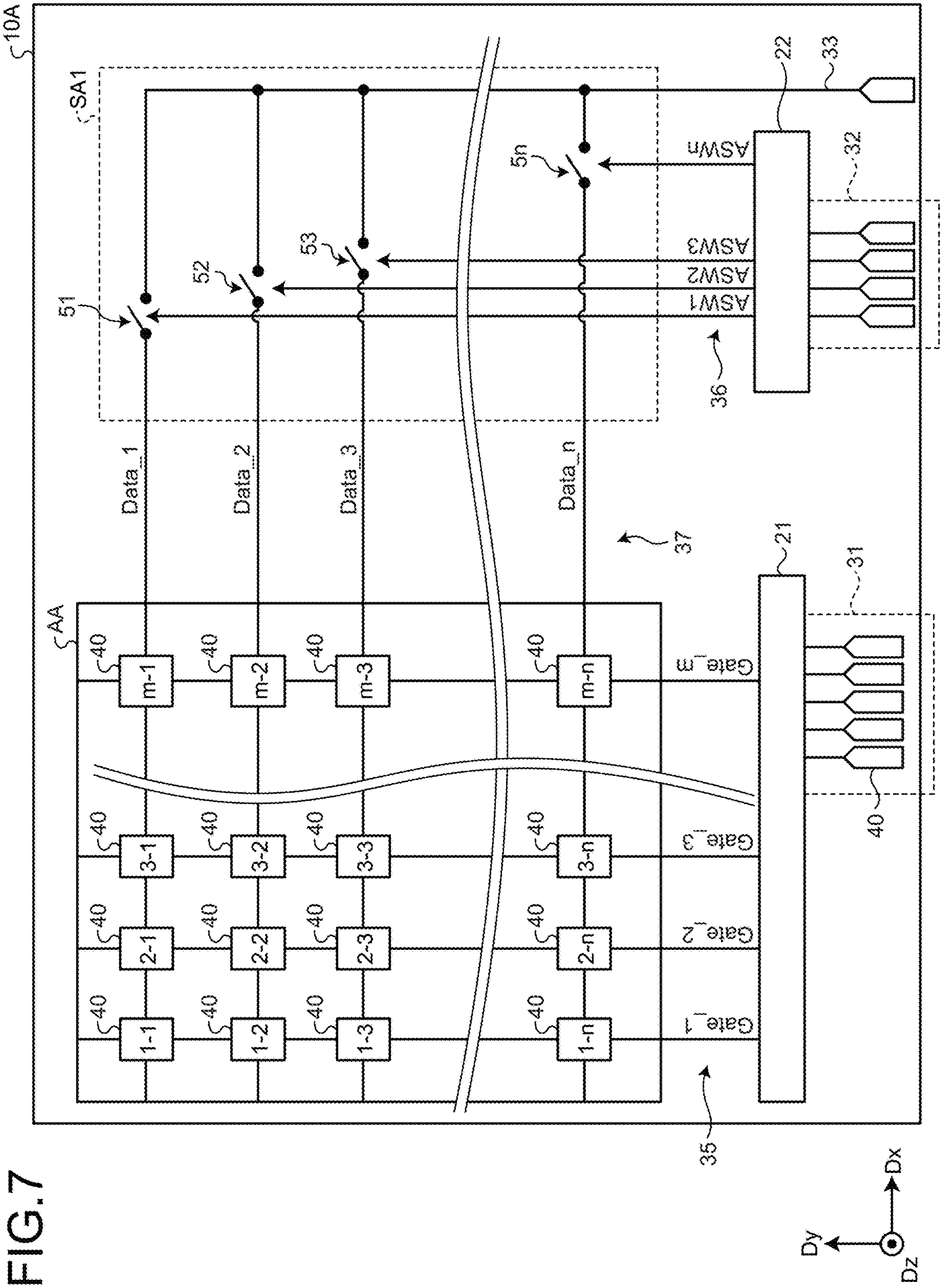
FIG. 7 is a schematic diagram illustrating another configuration example different from that of the first embodiment.

FIG. 7 is a schematic diagram illustrating another configuration example different from that of the first embodiment. The EC panel 10A in the other configuration example illustrated in FIG. 7 is different from the EC panel 10 in the first embodiment described with reference to FIG. 2, in that the wiring 34, the second switches 61, 62, 63, . . . , 6*n*, and the wiring line ASW0 are not provided. For the purpose of clarifying this difference, the switching circuit area SA in FIG. 2 is replaced with a switching circuit area SA1 in FIG. 7. Except for those noted above, the EC panel 10A is the same as the EC panel 10.

A reference example of signal control in the EC panel 10A will be described with reference to FIG. 8.

Figure 8:
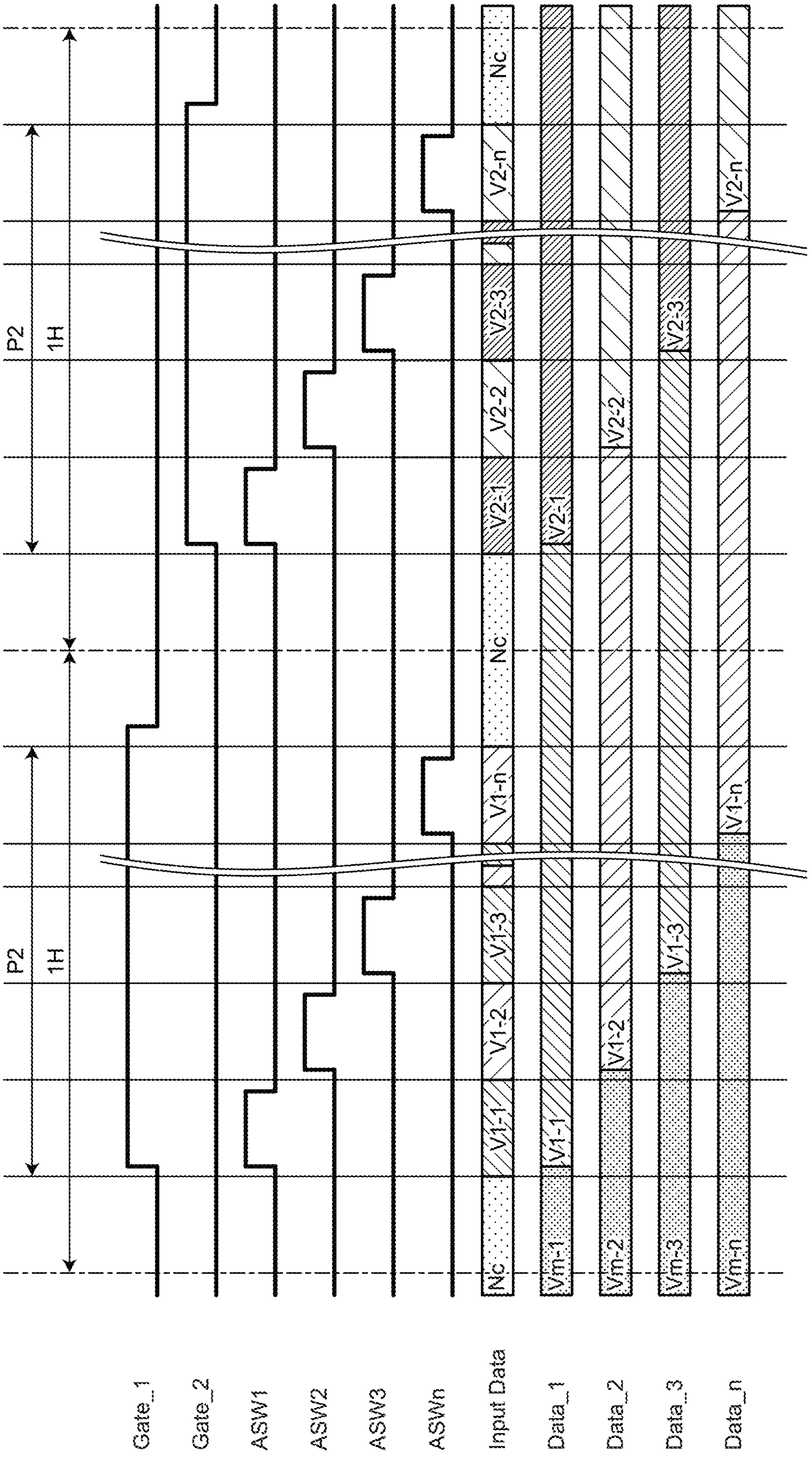
FIG. 8 is a time chart illustrating signal control in a reference example.

FIG. 8 is a time chart illustrating signal control in the reference example. As described with reference to FIG. 7, the EC panel 10A to which the reference example is applied includes no wiring line ASW0. Furthermore, the EC panel 10A to which the reference example is applied includes no wiring 34, hence no Vprecharge is present.

Therefore, in the reference example, the potentials of the transmission lines Data_1, Data_2, Data_3, . . . , Data_n do not become reset potentials such as the reset potential V1-0 and the reset potential V2-0. In the reference example, the potentials of the transmission lines Data_1, Data_2, Data_3, . . . , Data_n are updated only when, in the second period P2, the potentials of the wiring lines ASW1, ASW2, ASW3, ASWn become high at different timings and an application potential corresponding to the wiring line whose potential becomes high is given as Input Data to the wiring 33.

In the signal control in the reference example, the potentials of the transmission lines do not become reset potentials such as the reset potential V1-0 and the reset potential V2-0 and therefore a potential given to any one of the switching elements 40 momentarily enters another switching element 40 that is positioned next to the one switching element 40 when viewed in the first direction Dx. Specifically, an application potential V2-2 is given to the switching element 40 named "2-2" in FIG. 7. Before the application potential V2-2 is given to the switching element 40 named "2-2", the drive signal has been given to the gate since when the potential of the scanning line Gate_2 becomes high, thus a signal can be transmitted between the source and the drain. Therefore, until the time when the potential of the wiring line ASW2 becomes high and Input_Data of the application potential V2-2 is given to the switching element 40 named "2-2", the switching element 40 is in a state in which the application potential V1-2 is given to the switching element 40 and transmitted to the first electrode 13. Likewise, also the switching elements 40 named "2-3", . . . , "2-n" are in a state in which a signal different from a signal that should originally be given passes between the source and the drain and is given to the first electrode 13.

Thus, the reference example provides signal control that produces a period in which a potential different from a potential that should originally be given to each of the switching elements 40 is given. Such signal control is not preferred not only from the viewpoint of the degree of light transmission and the degree of coloration of the EC material 15, but also from the viewpoint of voltage tolerance of the switching elements 40.

For example, the potential of the second electrode 14 described with reference to FIG. 3 is not uniform in the Dx-Dy plane in some cases, depending on the relationship with a configuration that gives a constant potential to the second electrode 14. In contrast, the characteristics of voltage response of the EC material 15 are constant. Therefore, the voltage that is applied to the EC material 15 is sometimes controlled to be more uniform in the entire Dx-Dy plane by individually controlling potentials that are given to the first electrodes 13 via the switching elements 40 for the second electrode 14 being not uniform in the Dx-Dy plane. Under such control, the voltage of the signal passing between the source and the drain vary between the switching elements 40, and hence the switching elements 40 are different in voltage tolerance that is determined by the arrangement position of each switching element 40. In the reference example, as described with reference to FIG. 8, an application potential V(s-1)-r, which should originally be given to the switching element 40 named "(s-1)-r", is given to the switching element 40 named "s-r". s is a natural number within a range from 2 to m. In the reference example, when the switching elements 40 adjacent to each other in the first direction Dx have different voltage tolerances and the application potential V(s-1)-r produces a voltage exceeding the voltage tolerance of the switching element 40 named "s-r", the characteristics of the switching element 40 named "s-r" can be impaired.

In contrast, in the first embodiment, before the start of the second period P2, the potentials of the transmission lines Data_1, Data_2, Data_3, . . . , Data_n are set to be reset potentials such as the reset potential V1-0 and the reset potential V2-0, as described with reference to FIG. 6. In other words, the reset potentials are respectively set to allowable potentials of the voltage tolerances of all the switching elements 40, thereby substantially preventing a potential exceeding the voltage tolerances of the switching elements 40 from being given to the switching elements 40.

Even in the case where the switching elements 40 adjacent to each other in the first direction Dx have completely different voltage tolerances and cannot share any potential, making the reset potential V1-0 correspond to the switching element 40 named "1-r" and making the reset potential V2-0 correspond to the switching element 40 named "2-r" can substantially prevent a potential exceeding the voltage tolerances of the switching elements 40 from being given to the switching elements 40. Thus, the reset potentials can be individually controlled for each group of switching elements 40 sharing the scanning line 350, whereby a finer-tuned measure can be given to the voltage tolerances of the switching elements 40.

In the first embodiment, before the application potential V1-2 is given to the switching element 40 named "1-2", a signal has been given to the gate thereof since the time when the potential of the scanning line Gate_2 becomes high, whereby a signal can be transmitted between the source and the drain. Therefore, until the time when the potential of the wiring line ASW2 becomes high and Input_Data of the application potential V1-2 is given to the switching element 40 named "1-2", the switching element 40 is in a state in which the reset potential V1-0 is given to the switching element 40 and transmitted to the first electrode 13. Likewise, also each of the switching elements 40 named "1-3", . . . , "1-n" is in a state in which the reset potential passes between the source and the drain thereof and is given to the first electrode 13 before the potential corresponding to an individual signal is given thereto. Thus, momentarily giving a reset potential to the first electrode 13 does not practically cause a problem in an EC device such as the device 1. This is because the time required to apply the reset potential can be adjusted to be shorter than a response time until the degree of light transmission and the degree of coloration corresponding to the applied voltage is reflected in the EC material 15. The reset potential given in such a short time has no essential effect on the control of the EC material 15.

As described above, according to the first embodiment, the device 1 includes: two electrodes (the first electrode 13, the second electrode 14) facing each other with the EC material 15 interposed therebetween; a plurality of switching elements 40, one of a source and a drain of each of the switching elements 40 being coupled to one (the first electrode 13) of the two electrodes; a plurality of scanning lines (the scanning lines Gate_1, Gate_2, Gate_3, . . . , Gate_m) coupled to the gates of the switching elements 40; a plurality of transmission lines (the transmission lines Data_1, Data_2, Data_3, . . . , Data_n) coupled to the other one of the source and the drain of each of the switching elements 40; and a plurality of first switches (the first switches 51, 52, 53, . . . , 5*n*) capable of individually switching coupling between a first wiring (the wiring 33) to which an application potential given to the one of the two electrodes is supplied and each of the transmission lines, wherein the first period P1 and the second period P2 are alternately provided. The first period P1 is a period in which a reset potential of the transmission line is given at either a timing before the drive signal to be transmitted to the gates is given or a timing after the drive signal to be transmitted to the gates is given, and the second period P2 is a period in which the application potential is given to the transmission line at the other timing thereof. Thus, after an application potential to one of the switching elements 40 sharing the transmission line is given, the potential of the transmission line can be reset before an application potential to the other one of the switching elements 40 is given. Thus, an application potential can be substantially prevented from being shared between the switching elements 40 that share a transmission line but are coupled to different scanning lines. Thus, according to the first embodiment, the device can be more appropriately controlled.

The device 1 further includes: a second wiring (the wiring 34) configured to be supplied with reset potentials; and second switches (the second switches 61, 62, 63, . . . , 6*n*) capable of switching coupling between the second wiring and the transmission lines (the transmission lines Data_1, Data_2, Data_3, . . . , Data_n). At the first period P1, the second switches are controlled to couple the second wiring to the transmission lines, meanwhile, in the second period P2, the first switches (the first switches 51, 52, 53, . . . , 5*n*) are controlled to couple the first wiring to the transmission lines, whereby more appropriate device control can be more specifically realized.

Second Embodiment

Next, a second embodiment, which is partially different from the first embodiment, will be described with reference to FIG. 9 and FIG. 10. In descriptions of the second embodiment, what are different from those in the first embodiment will be specially described, meanwhile what are similar to those in the first embodiment will not be described in some cases by giving the same reference numerals thereto.

Figure 9:
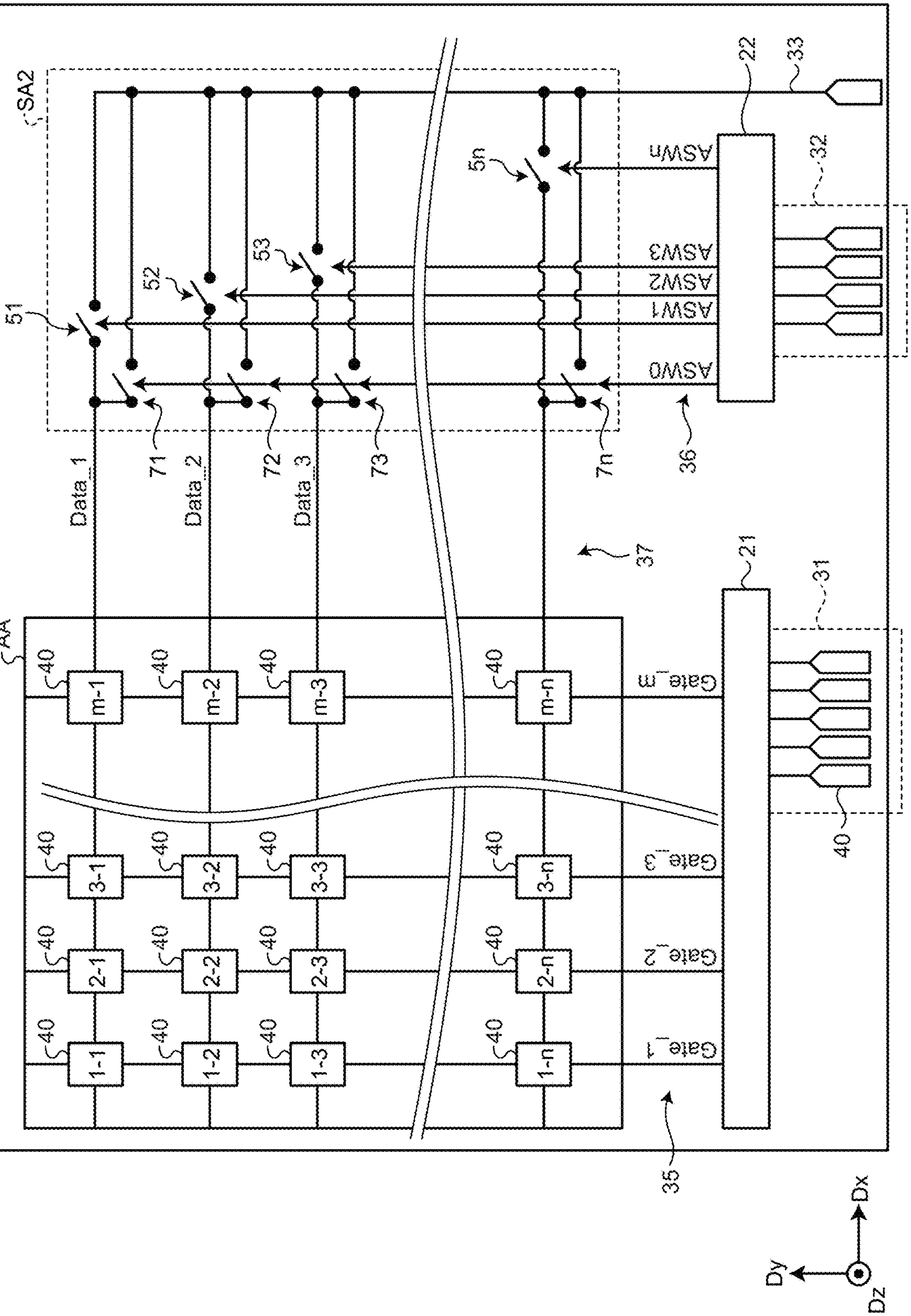
FIG. 9 is a schematic diagram of an EC panel according to a second embodiment.

FIG. 9 is a schematic diagram illustrating an EC panel 10B according to the second embodiment. The EC panel 10B is different in two respects from the EC panel 10 according to the first embodiment described with reference to FIG. 2. One of the two respects is the absence of the wiring 34. The other one of the two respects is that the second switches 61, 62, 63, . . . , 6*n* are replaced by third switches 71, 72, 73, . . . , 7*n*. For the purpose of clarifying these differences, the switching circuit area SA in FIG. 2 is replaced with a switching circuit area SA2 in FIG. 9. Except for those noted above, the EC panel 10B is the same as the EC panel 10.

Like the first switches 51, 52, 53, . . . , 5*n*, the third switches 71, 72, 73, . . . , 7*n* are disposed between a plurality of transmission lines such as the transmission lines Data_1, Data_2, Data_3, . . . , Data_n and the wiring 33 to open and close the transmission lines for signals. However, unlike the first switches 51, 52, 53, . . . , 5*n*, which are individually controlled by the individual potential control of the wiring lines ASW1, ASW2, ASW3, . . . , ASWn, the third switches 71, 72, 73, . . . , 7*n* are collectively controlled by the potential control of the wiring line ASW0.

Figure 10:
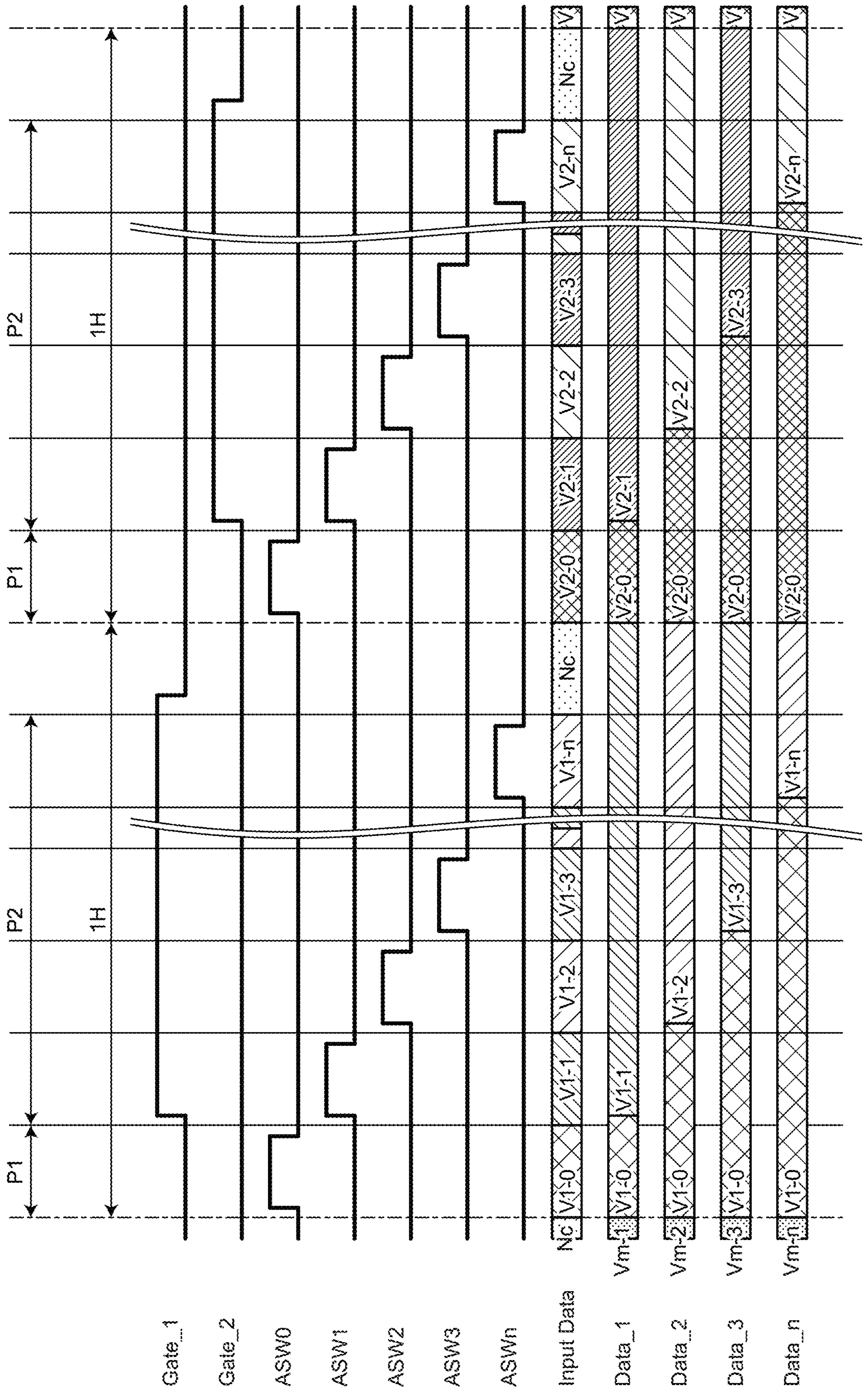
FIG. 10 is a time chart illustrating signal control in the second embodiment.

FIG. 10 is a time chart illustrating signal control in the second embodiment. The EC panel 10B according to the second embodiment includes no wiring 34 as described with reference to FIG. 9. Therefore, the time chart illustrated in FIG. 10 has no Vprecharge, unlike the time chart according to the first embodiment illustrated in FIG. 6. In contrast, in the second embodiment, reset potentials such as the reset potential V1-0 and the reset potential V2-0 are given as Input_Data to the wiring 33 in the first period P1.

Like the first embodiment described with reference to FIG. 6, also in the second embodiment, the potential of the wiring line ASW0 becomes high in the first period P1, as illustrated in FIG. 10. Thus, in the second embodiment, the third switches 71, 72, 73, . . . , 7*n* become in the coupling state (see FIG. 9). In other words, in the first period P1, the transmission lines Data_1, Data_2, Data_3, . . . . Data_n are coupled to the wiring 33. As described above, in the second embodiment, reset potentials such as the reset potential V1-0 and the reset potential V2-0 are given as Input_Data to the wiring 33 in the first period P1, and accordingly the reset potentials are given to the transmission lines Data_1, Data_2, Data_3, . . . , Data_n in the first period P1. Hence, the second embodiment is the same as the first embodiment in terms of signals given to the transmission lines Data_1, Data_2, Data_3, . . . , Data_n.

Except for those noted above, the second embodiment is the same as the first embodiment. According to the second embodiment, the device 1 includes third switches (the third switches 71, 72, 73, . . . , 7*n*) capable of collectively switching coupling between the first wiring (the wiring 33) and the transmission lines (the transmission lines Data_1, Data_2, Data_3, . . . , Data_n). In the first period P1, reset potentials are given to the first wiring, and the third switches are controlled to couple the first wiring to the transmission lines, meanwhile, in the second period P2, an application potential is given to the first wiring, and the first switches are controlled to couple the first wiring to the transmission lines, whereby the same effects as those of the first embodiment can be achieved with a different aspect from that in the first embodiment. Furthermore, compared to the first embodiment, the second wiring (the wiring 34) can be omitted.

Third Embodiment

Next, a third embodiment, which is partially different from the first embodiment and the second embodiment, will be described with reference to FIG. 11. In descriptions of the third embodiment, what are different from those of the first embodiment will be specially described, meanwhile what are similar to those of the first embodiment will not be described in some cases by giving the same reference numerals thereto. In the third embodiment, the EC panel 10A described with reference to FIG. 7 is employed.

Figure 11:
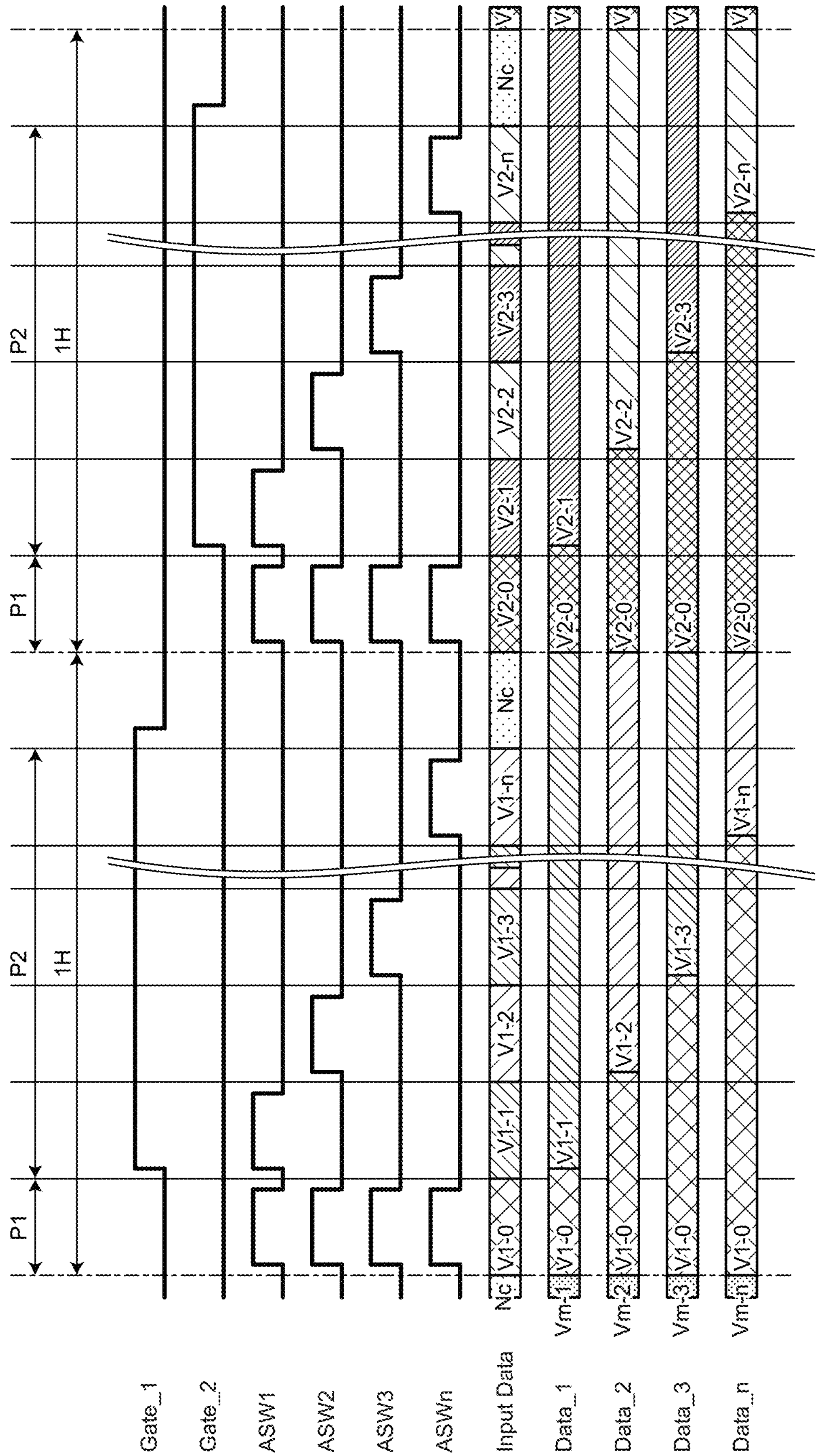
FIG. 11 is a time chart illustrating signal control in a third embodiment.

FIG. 11 is a time chart illustrating signal control in the third embodiment. As described with reference to FIG. 7, the EC panel 10A employed in the third embodiment does not include the wiring line ASW0. Furthermore, the EC panel 10A does not include the wiring 34, hence there is no Vprecharge in the time chart illustrated in FIG. 11, like the second embodiment. Like the second embodiment, in the third embodiment, reset potentials such as the reset potential V1-0 and the reset potential V2-0 are given as Input Data to the wiring 33 in the first period P1.

As illustrated in FIG. 11, in the third embodiment, potentials of all the wire lines ASW1, ASW2, ASW3, . . . , ASWn become high in the first period P1. Thus, all the first switches 51, 52, 53, . . . , 5*n* become in the coupling state (see FIG. 9). In other words, in the first period P1, the transmission lines Data_1, Data_2, Data_3, . . . , Data_n are coupled to the wiring 33. As described above, in the third embodiment, since reset potentials such as the reset potential V1-0 and the reset potential V2-0 are given as Input Data to the wiring 33 in the first period P1, the reset potentials are given to the transmission lines Data_1, Data_2, Data_3, . . . , Data_n in the first period P1. Hence, the third embodiment is the same as the first embodiment and the second embodiment in terms of signals given to the transmission lines Data_1, Data_2, Data_3, . . . , Data_n.

Except for those noted above, the third embodiment is the same as the first embodiment. According to the third embodiment, in the first period P1, reset potentials are given to the first wiring (the wiring 33), and first switches (the first switches 51, 52, 53, . . . , 5*n*) are controlled to couple the first wiring to the transmission lines (the transmission lines Data_1, Data_2, Data_3, . . . , Data_n), meanwhile, in the second period P2, an application potential is given to the first wiring, and the first switches are controlled to couple the first wiring to the transmission lines, whereby the same effect as those of the first embodiment can be achieved in a different aspect from that in the first embodiment. Furthermore, compared to the first embodiment, the second wiring (the wiring 34) and the first switches (the first switches 51, 52, 53, . . . , 5*n*) can be omitted.

In FIG. 3, the first electrode 13 is provided for each of the switching elements 40. In other words, in the first embodiment described above, the switching elements 40 are arranged in a matrix of a row-column configuration in FIG. 2, and the first electrodes 13 are individually provided such that the first electrodes 13 correspond to the switching elements 40 on a one-to-one basis. Such aspect of the first electrode 13 is not necessarily essential. For example, the first electrode 13 may be provided having the same configuration as a continuous electrode layer in the active area AA, like the second electrode 14. Even in this case, the switching elements 40 are coupled to the first electrode 13 at different positions. A state in which potentials are not uniform in the active area AA may possibly occur in the first electrode 13, and therefore a technical significance of controlling the voltage that is applied to the EC material 15 via each of the switching elements 40 is established.

In the description with reference to FIG. 3, the switching elements 40 directly transmit voltages from the transmission lines Data_1, Data_2, Data_3, . . . , Data_n to the first electrodes 13. Alternatively, a circuit configured to perform processing based on an application potential given from the wiring 33, such as a circuit configured to amplify a signal like an amplifier, may be further added on signal transmission lines between the transmission lines Data_1, Data_2, Data_3, . . . , Data_n and the first electrode 13. In this case, the potential given from the wiring 33 is regarded as "(a potential of) a signal indicating an application potential". A potential obtained by, for example, amplifying the above-mentioned potential is then given as an application potential to the first electrode 13. Like the first, second, and third embodiments, when a circuit configured to amplify a signal, such as an amplifier, is absent, an application potential from the wiring 33 is given to the first electrode 13 as it is.

It is understood that other effects achieved by the aspects described in the embodiments, the effects being apparent from the descriptions in the present specification or being conceivable by those skilled in the art, are naturally achieved by the present disclosure.

What is claimed is:

1. An electrochromic device comprising:

two electrodes facing each other with an electrochromic material interposed therebetween;

a plurality of switching elements, one of a source and a drain of each of the switching elements being coupled to one of the two electrodes;

a plurality of scanning lines coupled to gates of the switching elements;

a plurality of transmission lines coupled to the other one of the source and the drain of each of the switching elements; and a plurality of first switches capable of individually switching coupling between a first wiring and each of the transmission lines, the first wiring being configured to be supplied with a signal potential corresponding to an application potential given to the one of the two electrodes, wherein a first period and a second period are alternately provided, the first period is a period in which reset potentials of the transmission lines are given at either a timing before a signal to be transmitted to the gates is given to the scanning lines or a timing after the signal to be transmitted to the gates is given to the scanning lines, and the second period is a period in which the signal potential is given to the transmission lines at the other timing of the timing before the signal to be transmitted to the gates is given to the scanning lines and the timing after the signal to be transmitted to the gates is given to the scanning lines.

2. The electrochromic device according to claim 1, further comprising:

a second wiring configured to be supplied with the reset potentials; and a second switch capable of switching coupling between the second wiring and the transmission lines, wherein in the first period, the second switch is controlled to couple the second wiring to the transmission lines, and in the second period, the first switches are controlled to couple the first wiring to the transmission lines.

3. The electrochromic device according to claim 1, further comprising:

a third switch capable of collectively switching coupling between the first wiring and the transmission lines, wherein in the first period, the reset potentials are given to the first wiring, and the third switch is controlled to couple the first wiring to the transmission lines, and in the second period, the signal potential is given to the first wiring and the first switches are controlled to couple the first wiring to the transmission lines.

4. The electrochromic device according to claim 1, wherein, in the first period, the reset potentials are given to the first wiring, and the first switches are controlled to couple the first wiring to the transmission lines, and in the second period, the signal potential is given to the first wiring, and the first switches are controlled to couple the first wiring to the transmission lines.

* * * * *